(12) United States Patent
Malychok et al.

(10) Patent No.: US 10,458,468 B2
(45) Date of Patent: Oct. 29, 2019

(54) CAM FOLLOWER FOR HIGH AXIAL LOAD APPLICATIONS

(71) Applicant: Roller Bearing Company of America, Inc., Oxford, CT (US)

(72) Inventors: Roman Malychok, Jamison, PA (US); Lyudmyla Malychok, Jamison, PA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 16/249,255

(22) Filed: Jan. 16, 2019

(65) Prior Publication Data

US 2019/0219146 A1   Jul. 18, 2019

Related U.S. Application Data

(60) Provisional application No. 62/617,738, filed on Jan. 16, 2018.

(51) Int. Cl.
  *F16C 19/38*  (2006.01)
  *F16D 3/202*  (2006.01)
  *F16H 53/06*  (2006.01)

(52) U.S. Cl.
  CPC .............. *F16C 19/38* (2013.01); *F16D 3/202* (2013.01); *F16H 53/06* (2013.01)

(58) Field of Classification Search
  CPC .......... F16H 53/00; F16H 53/02; F16H 53/06; F16D 3/202; F16C 19/00; F16C 19/22; F16C 19/34; F16C 19/38; F16C 19/40; F16C 33/34; F16C 33/76; F16C 33/78; F16C 23/06; F16C 21/00
  See application file for complete search history.

(56) References Cited

U.S. PATENT DOCUMENTS

| | | | |
|---|---|---|---|
| 1,920,726 A | 8/1933 | Wallgren | |
| 3,532,400 A * | 10/1970 | Benson | F16C 19/38 384/484 |
| 4,727,832 A | 3/1988 | Miyamura et al. | |
| 4,943,172 A | 7/1990 | Waldrep | |
| 5,071,265 A | 12/1991 | Bowen et al. | |
| 5,205,657 A | 4/1993 | Feld | |

(Continued)

FOREIGN PATENT DOCUMENTS

| | | |
|---|---|---|
| CN | 202391948 U | 8/2012 |
| GB | 1050399 A | 12/1966 |

(Continued)

*Primary Examiner* — Prasad V Gokhale
(74) *Attorney, Agent, or Firm* — Murtha Cullina LLP

(57) ABSTRACT

A roller assembly includes an outer ring having an interior area defined by an inner surface extending between a first and second axial end thereof. The inner surface has a bearing surface. A flanged headed shaft having an exterior bearing surface extends into the interior area. The shaft has a circumferential retainer receiving surface thereon. Two rows of rollers are positioned in the interior area with a spacer ring therebetween. A retainer ring is secured to the retainer receiving surface. The two rows of rollers and the spacer are axially retained on the shaft by and between the flanged head and the retaining ring so that the roller assembly withstands an axial load of up to 100 percent of an applied radial load.

10 Claims, 3 Drawing Sheets

(56) References Cited

U.S. PATENT DOCUMENTS

| | | | |
|---|---|---|---|
| 5,261,750 A | | 11/1993 | Eckhardt et al. |
| 5,531,137 A | * | 7/1996 | Guilford ............... F16C 13/006 |
| | | | 74/569 |
| 9,004,774 B1 | | 4/2015 | Delgado |
| 2003/0210840 A1 | | 11/2003 | Ogawa |
| 2012/0128288 A1 | * | 5/2012 | Guilford ............... F16C 33/723 |
| | | | 384/489 |
| 2014/0080658 A1 | * | 3/2014 | Edelmann ............... F16C 25/06 |
| | | | 475/331 |
| 2015/0013420 A1 | | 1/2015 | Shibutani et al. |
| 2017/0232794 A1 | | 8/2017 | Abrahamson |
| 2018/0149257 A1 | * | 5/2018 | Prescavage ......... F16C 33/7853 |
| 2018/0172069 A1 | | 6/2018 | Askestad |
| 2018/0202421 A1 | | 7/2018 | Collins |

FOREIGN PATENT DOCUMENTS

| | | |
|---|---|---|
| GB | 1088676 A | 10/1967 |
| GB | 1374226 A | 11/1974 |
| GB | 1421751 A | 1/1976 |
| JP | 2008267403 A | 11/2008 |
| JP | 2009257569 A | 11/2009 |
| JP | 2017026001 A | 2/2017 |
| KR | 100415910 B1 | 1/2004 |

\* cited by examiner

CAM FOLLOWER FOR HIGH AXIAL LOAD APPLICATIONS

CROSS REFERENCE TO RELATED APPLICATION

The instant application is a non-provisional of, and claims priority benefit to, U.S. Provisional Patent Application No. 62/617,738, entitled "CAM FOLLOWER FOR HIGH THRUST LOAD APPLICATIONS," filed on Jan. 16, 2018, the entirety of which is incorporated by reference herein.

FIELD OF THE INVENTION

The present invention relates generally to a cam follower for high axial load applications and more particularly to a cam follower that can withstand axial loads up to 100 percent of applied radial loads.

BACKGROUND OF THE INVENTION

Cam follower assemblies and yoke roller assemblies are used in many industrial manufacturing and conveying applications. The cam follower assemblies and the yoke roller assemblies each typically include an outer ring disposed around an inner ring or stud with a plurality of rolling elements such as needle rollers disposed in a cavity therebetween. In some cam follower assemblies and yoke roller assemblies, there are two rows of cylindrical rollers, separated by an axial thrust ring positioned between the two rows of rollers and seated in a groove in the inner ring or stud.

Cam follower assemblies and yoke roller assemblies are subject to high loads when used in various applications. Such loads include radial and axial loads. Axial loads are often referred to as thrust loads. Typical cam follower assemblies and yoke roller assemblies can safely operate and withstand axial loads up to 10 percent of the applied radial load. Prior art cam follower assemblies and yoke roller assemblies tend to catastrophically fail when the axial load exceeds 10 percent of the applied radial load. The cause of such failures in the prior art cam follower assemblies and yoke roller assemblies is the tendency of the axial thrust ring to disengage from the groove in the stud upon application of excessive axial loads.

Based on the foregoing, there is a need for cam follower assemblies and yoke roller assemblies with increased axial load capacity.

SUMMARY

There is disclosed herein, a roller assembly for a cam follower or a yoke roller. The roller assembly includes an outer ring that has an interior area. The interior area is defined by an inner surface that extends between a first axial end and a second axial end of the outer ring. The inner surface has a radially inward facing bearing surface that extends between a first radially inwardly extending flange and a second radially inwardly extending flange. The first radially inwardly extending flange has a first axially inward facing abutment surface and the second radially inwardly extending flange has a second axially inward facing abutment surface. A one piece shaft extends into the interior area. The shaft extends continuously between a third axial end and a fourth axial end of the shaft. The shaft has a head flange that extends radially outward from the shaft proximate the third axial end. The head flange has a third axially inward facing abutment surface. The shaft has an exterior bearing surface that extends between the third axially inward facing abutment surface and a circumferential retainer receiving surface. The circumferential retainer receiving surface is located between the third axial end and the fourth axial end. A first row of a plurality of first rollers is positioned in the interior area between and in rolling engagement with the exterior bearing surface and the radially inward facing bearing surface. A second row of a plurality of second rollers is positioned in the interior area between and in rolling engagement with the exterior bearing surface and the radially inward facing bearing surface. A spacer ring is disposed around and engages the exterior bearing surface. The spacer ring is positioned between the first row of the plurality of first rollers and the second row of the plurality of second rollers. A retainer ring is secured to the retainer receiving surface. The retainer ring has a fourth axially inward facing abutment surface. The outer ring is axially retained on the first row of the plurality of first rollers and the second row of the plurality of second rollers by and between the first axially inward facing abutment surface and the second axially inward facing abutment surface. The first row of the plurality of first rollers, the spacer and the second row of the plurality of second rollers is axially retained on the shaft by and between the third axially inward facing abutment surface and the fourth axially inward facing abutment surface such that the roller assembly withstands an axial load (i.e., a thrust load) of up to 100 percent of an applied radial load.

In one embodiment, the inner surface includes a first seal receiving pocket formed between the first radially inwardly extending flange and the first axial end. A first annular seal is positioned in and seated in the first seal receiving pocket, with a portion of the first annular seal slidingly and sealingly engaging a portion of the head flange.

In one embodiment, the inner surface includes a second seal receiving pocket formed between the second radially inwardly extending flange and the second axial end. A second annular seal is positioned in and seated in the second seal receiving pocket. A portion of the second annular seal slidingly and sealingly engages a portion of the retaining ring.

In one embodiment, the first annular seal and/or the second annular seal is made from an elastomeric material.

In one embodiment, the shaft is made from a carbon steel alloy, such as SAE 52100. A portion of the shaft is case hardened.

DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION OF THE PREFERRED EMBODIMENT

Figure 1:
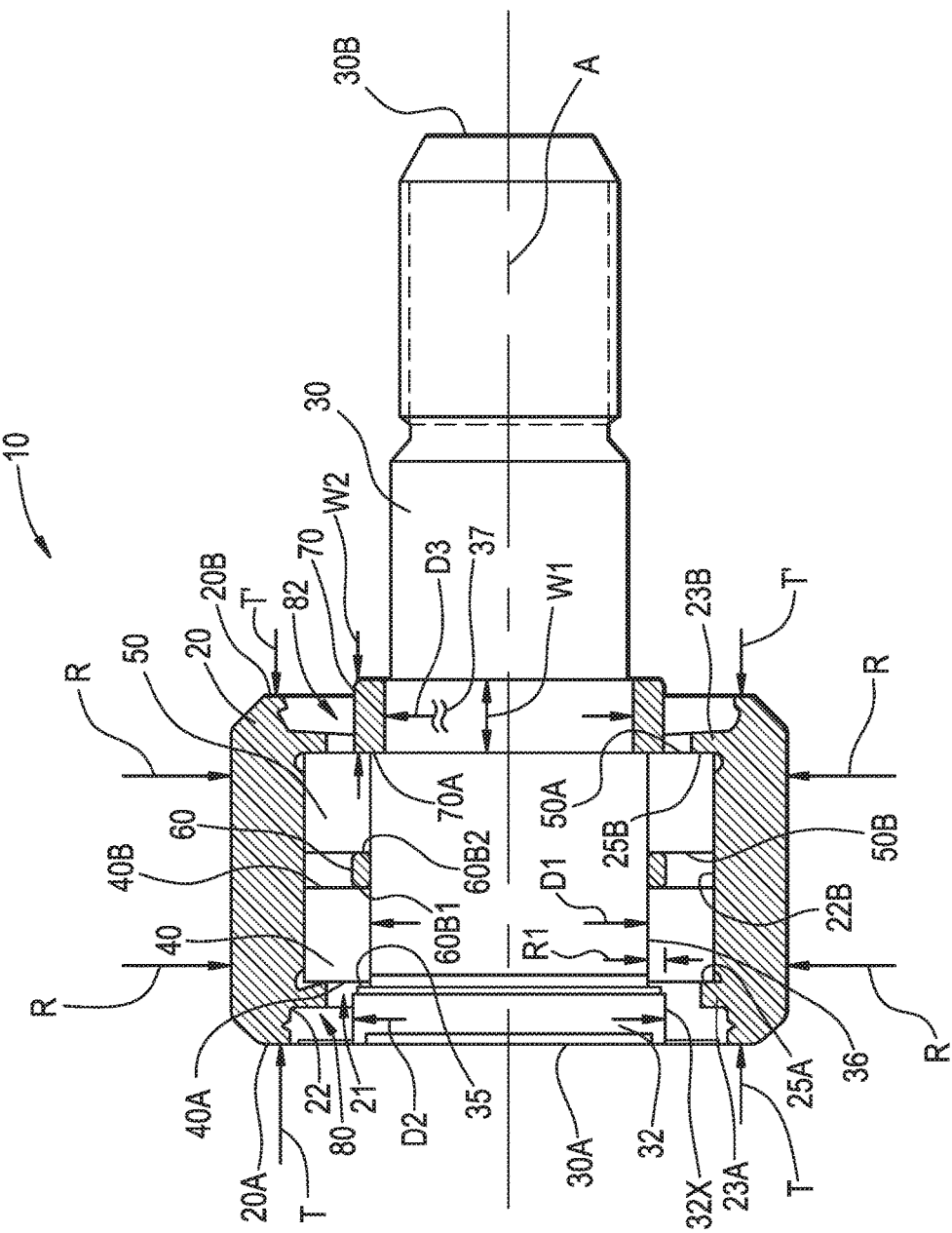
FIG. 1 is a cross-sectional view of the roller assembly of the present invention.

As shown in FIG. 1, a roller assembly for a cam follower is generally designated by the numeral 10. The roller assembly 10 includes an outer ring 20 that has an interior area 21.

The interior area is defined by an inner surface 22 that extends between a first axial end 20A and a second axial end 20B of the outer ring 20. The inner surface 22 has a radially inward facing bearing surface 22B that extends between a first radially inwardly extending flange 23A and a second radially inwardly extending flange 23B. The first radially inwardly extending flange 23A has a first axially inward facing abutment surface 25A; and the second radially inwardly extending flange 23B has a second axially inward facing abutment surface 25B.

While the roller assembly 10 is shown and described for a cam follower, the present invention is not limited in this regard as the modification may be made to employ a similar configuration in a yoke assembly in which a shaft extends outwardly from the first axial end and the second axial end of the outer ring 20

As shown in FIG. 1, a one piece shaft 30 extends into the interior area 21. The shaft 30 extends continuously between a third axial end 30A and a fourth axial end 30B of the shaft 30. The shaft has a head flange 32 that extends radially outward from the shaft 30, proximate the third axial end 30A. The head flange 32 has a cylindrical exterior surface 32X extending circumferentially and entirely around the head flange 32. The head flange 32 has a third axially inward facing abutment surface 35. The shaft 30 has an exterior bearing surface 36 that extends between the third axially inward facing abutment surface 35 and a circumferential retainer receiving surface 37. The exterior bearing surface 36 is cylindrical and defines a diameter D1. The cylindrical exterior surface 32X extends radially outward from the exterior bearing surface 36 by a distance R1. The cylindrical exterior surface 32X defines a diameter D2. In one embodiment, the diameter D2 is about 110 to about 120 percent of the diameter D1. The circumferential retainer receiving surface 37 is located between the third axial end 30A and the fourth axial end 30B. The circumferential retainer receiving surface 37 defines a diameter D3 that is about 90 to about 95 inventors percent of the diameter D1. The circumferential retainer receiving surface 37 has an axial width W1.

As shown in FIG. 1, a first row of a plurality of first rollers 40 is positioned in the interior area 21 between and in rolling engagement with the exterior bearing surface 36 and the radially inward facing bearing surface 22B. Each of the plurality of first rollers has an axial end 40A that slidingly engages the first axially inward facing abutment surface 25A and the third axially inward facing abutment surface 35, thereby axially retaining the first row of the plurality of first rollers 40 in the interior area 21.

As shown in FIG. 1, a second row of a plurality of second rollers 50 is positioned in the interior area 21 between and in rolling engagement with the exterior bearing surface 36 and the radially inward facing bearing surface 22B. Each of the plurality of second rollers 50 has an axial end 50A that slidingly engages the second axially inward facing abutment surface 25B, thereby axially retaining the second row of the plurality of second rollers 50 in the interior area 21.

As shown in FIG. 1, a spacer ring 60 is disposed around and engages the exterior bearing surface 36. The spacer ring is positioned between the first row of the plurality of first rollers 40 and the second row of the plurality of second rollers 50. The spacer ring 60 extends between opposing axial ends 60B1, 60B2, thereof. Each of the plurality of first rollers 40 has another axial end 40B that slidingly engage the axial end 60B1 of the retaining ring 60; and each of the plurality of second rollers 50 has another axial end 50B that slidingly engage the axial end 60B2 of the retaining ring 60, thereby maintaining the plurality of first rollers 40 spaced apart from and in axial relation to the plurality of second rollers 50.

Figure 3:
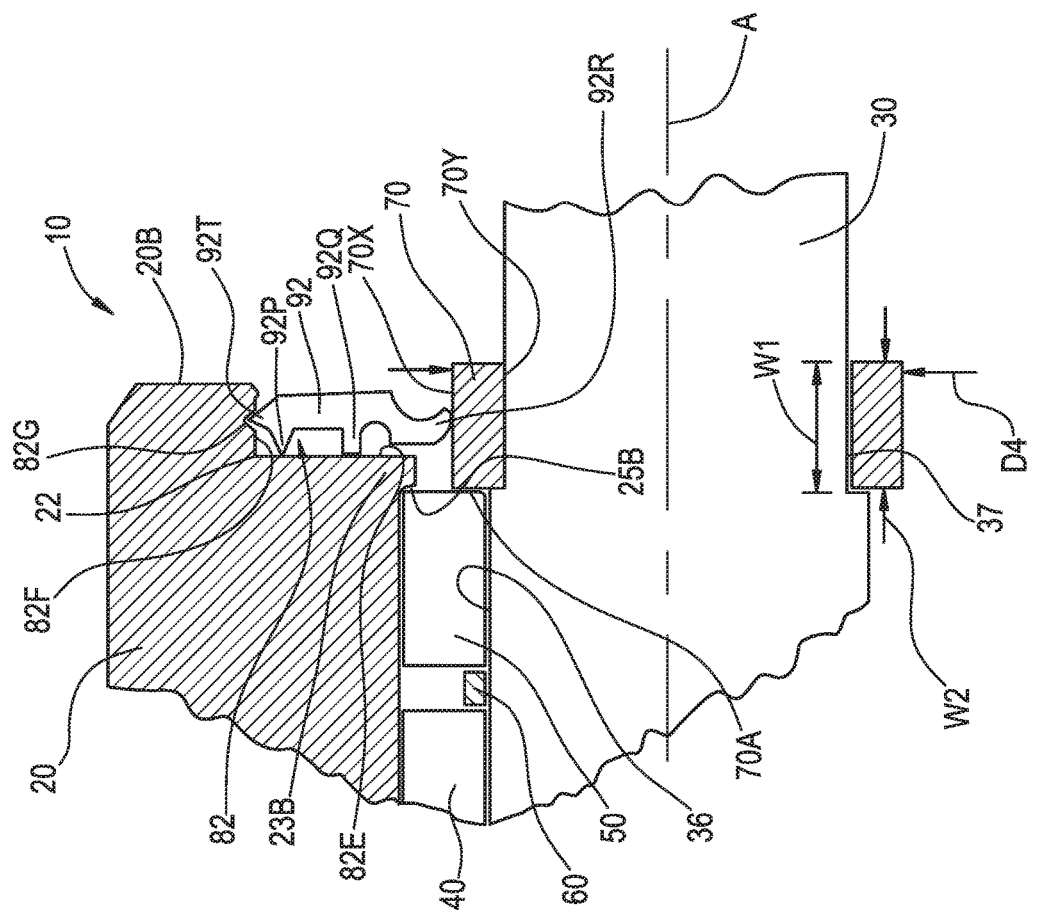
FIG. 3 is an enlarged view of a first seal pocket of the roller assembly of FIG. 1.

As shown in FIG. 1, a retainer ring 70 is secured (e.g., press fit, threaded, staked, pinned or welded to the retainer receiving surface 37. The retaining ring 70 has a fourth axially inward facing abutment surface 70A. The retaining ring 70 has an axial width W2 that is about equal to the axial width W1. Each of the axial ends 50A of the plurality of second rollers 50 slidingly engage fourth axially inward facing abutment surface 70. Referring to FIG. 3, the retaining ring 70 has a cylindrical exterior surface 70X extending circumferentially therearound. The retaining ring 70 has a cylindrical interior surface 70Y has an outside diameter D4 of a magnitude sufficient to create a press fit (i.e., interference fit) of the retaining ring onto the shaft 30 at the retainer receiving surface 37.

Referring to FIG. 1, the outer ring 20 is axially retained on the first row of the plurality of first rollers 40 and the second row of the plurality of second rollers 50 by and between the first axially inward facing abutment surface 25A and the second axially inward facing abutment surface 25B. The first row of the plurality of first rollers 40, the spacer 60 and the second row of the plurality of second rollers 50 are axially retained on the shaft 30 by and between the third axially inward facing abutment surface 35 and the fourth axially inward facing abutment surface 70A, such that the roller assembly 10 withstands an axial load (i.e., thrust load) of up to 100 percent of an applied radial thrust load. As shown in FIG. 1 the radial load is indicated by the arrows marked R and the axial load is indicated by the arrows marked T and T'. The head flange 35 and its diameter D2, the direct contact of the spacer ring 60 with the first and second plurality of rollers, 40 and 50 and diameter D3, respectively and the press fit of the retainer ring 70 onto the retainer receiving surface 37 of the shaft 30 cooperate to provide the roller assembly 10 the ability to withstand an axial load (i.e., thrust load) of up to 100 percent of an applied radial thrust load.

As shown in FIG. 1, the roller assembly 10 includes a first and second seal receiving pocket 80 and 82 proximate the first and second axial ends 20A and 20B, respectively, and as described herein.

Figure 2:
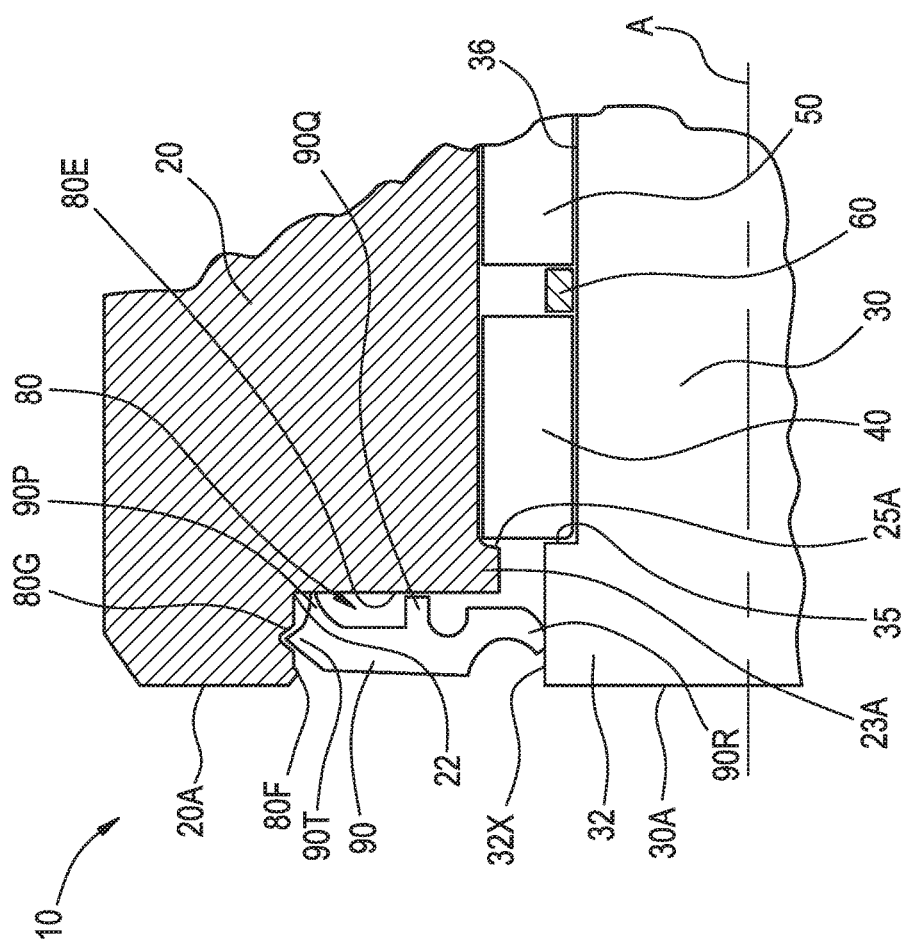
FIG. 2 is an enlarged view of a first seal pocket of the roller assembly of FIG. 1.

As shown in FIG. 2, the inner surface 22 has the first seal receiving pocket 80 formed therein, between the first radially inwardly extending flange 23A and the first axial end 20A. The first seal receiving pocket 80 has a radially outward extending groove 80G extending circumferentially around a radially inward facing surface 80F thereof. The first seal receiving pocket 80 includes an axially outward facing seal receiving surface 80E. A first annular seal 90 is positioned in and seated (fixedly secured) in the first seal receiving pocket 80. The first annular seal 90 has a tab 90T extending radially outward therefrom. The tab 90T is seated in the groove 80G. The annular seal 90 has two projections 90P and 90Q extending axially therefrom. The projections 90P and 90Q seat against the axially outward facing seal receiving surface 80E to seat the annular seal 90 in a predetermined position in the seal receiving pocket 80. A flexible tip portion 90R of the first annular seal 90 slidingly and sealingly engages a portion of the cylindrical exterior surface 32X of the head flange 32.

As shown in FIG. 3, the inner surface 22 has the second seal receiving pocket 82 formed therein, between the second radially inwardly extending flange 23B and the second axial end 20B. The second seal receiving pocket 82 has a radially outward extending groove 82G extending circumferentially around a radially inward facing surface 82F thereof. The second seal receiving pocket 82 includes an axially outward facing seal receiving surface 82E. A second annular seal 92 is positioned in and seated (fixedly secured) in the second seal receiving pocket 82. The second annular seal 92 has a tab 92T extending radially outward therefrom. The tab 92T is seated in the groove 82G. The annular seal 92 has two projections 92P and 92Q extending axially therefrom. The projections 92P and 92Q seat against the axially outward facing seal receiving surface 82E to seat the annular seal 92 in a predetermined position in the seal receiving pocket 82. A flexible tip portion 92R of the second annular seal 92 slidingly and sealingly engages the cylindrical exterior surface 70X of the retaining ring 70.

The first annular seal and/or the second annular seal are made from an elastomeric material such as nitrile rubber or other polymer.

The shaft 30 is manufactured from a carbon steel alloy such as SAE 52100. A portion of the shaft is case hardened.

Although the present invention has been disclosed and described with reference to certain embodiments thereof, it should be noted that other variations and modifications may be made, and it is intended that the following claims cover the variations and modifications within the true scope of the invention.

What is claimed is:

1. A roller assembly for a cam follower or a yoke roller, the roller assembly comprising:
   an outer ring having an interior area, the interior area being defined by an inner surface extending between a first axial end and a second axial end of the outer ring, the inner surface having a radially inward facing bearing surface extending between a first radially inwardly extending flange and a second radially inwardly extending flange, the first radially inwardly extending flange has a first axially inward facing abutment surface and the second radially inwardly extending flange has a second axially inward facing abutment surface;
   a one piece shaft extending into the interior area, the shaft extending continuously between a third axial end and a fourth axial end of the shaft, the shaft having a head flange extending radially outward from the shaft proximate the third axial end, the head flange having a third axially inward facing abutment surface, and the shaft having an exterior bearing surface, extending between the third axially inward facing abutment surface and a circumferential retainer receiving surface, the circumferential retainer receiving surface being located between the third axial end and the fourth axial end;
   a first row of a plurality of first rollers positioned in the interior area between and in rolling engagement with the exterior bearing surface and the radially inward facing bearing surface;
   a second row of a plurality of second rollers positioned in the interior area between and in rolling engagement with the exterior bearing surface and the radially inward facing bearing surface;
   a spacer ring disposed around and engaging the exterior bearing surface, the spacer ring being positioned between the first row of the plurality of first rollers and the second row of the plurality of second rollers;
   a retainer ring secured to the retainer receiving surface, the retainer ring having a fourth axially inward facing abutment surface;
   the outer ring being axially retained on the first row of the plurality of first rollers and the second row of the plurality of second rollers by and between the first axially inward facing abutment surface and the second axially inward facing abutment surface; and
   the first row of the plurality of first rollers, the spacer and the second row of the plurality of second rollers being axially retained on the shaft by and between the third axially inward facing abutment surface and the fourth axially inward facing abutment surface such that the roller assembly withstands an axial load of up to 100 percent of an applied radial load.

2. The roller assembly of claim 1, wherein:
   the inner surface further comprises a first seal receiving pocket formed between the first radially inwardly extending flange and the first axial end;
   a first annular seal positioned in and seated in the first seal receiving pocket, a portion of the first annular seal slidingly and sealingly engaging a portion of the head flange.

3. The roller assembly of claim 2, wherein the first annular seal comprises an elastomeric material.

4. The roller assembly of claim 1, wherein:
   the inner surface further comprises a second seal receiving pocket formed between the second radially inwardly extending flange and the second axial end;
   a second annular seal positioned in and seated in the second seal receiving pocket, a portion of the second annular seal slidingly and sealingly engaging a portion of the retaining ring.

5. The roller assembly of claim 4, wherein the second annular seal comprises an elastomeric material.

6. The roller assembly of claim 1, wherein the shaft comprises a carbon steel.

7. The roller assembly of claim 1, wherein a portion of the shaft is case hardened.

8. The roller assembly of claim 1, wherein the shaft has a surface hardness of 59 to 62 Rockwell C scale.

9. The roller assembly of claim 1, wherein the shaft has a core hardness of 30 to 35 Rockwell C scale.

10. The roller assembly of claim 1, wherein the shaft extends outwardly from at least one of the first axial end and the second axial end, of the outer ring.

* * * * *